United States Patent [19]

Yamamoto et al.

[11] Patent Number: 4,984,874
[45] Date of Patent: Jan. 15, 1991

[54] LIQUID CRYSTAL DISPLAY DEVICE HAVING RETARDATION FILMS

[75] Inventors: Tomiaki Yamamoto, Chigasaki; Akio Murayama, Kamakura; Susumu Kondo, Yokosuka; Hitoshi Hato, Yokohama; Shinichi Kamagami; Shoichi Matsumoto, both of Yokohama, all of Japan

[73] Assignee: Kabushiki Kaisha Toshiba, Kawasaki, Japan

[21] Appl. No.: 376,653

[22] Filed: Jul. 7, 1989

[30] Foreign Application Priority Data

Jul. 8, 1988 [JP] Japan .................................. 63-169011

[51] Int. Cl.$^5$ ............................................. G02F 1/13
[52] U.S. Cl. ..................................... 350/334; 350/337; 350/339 R; 350/347 R
[58] Field of Search ..................... 350/334, 337, 347 R, 350/339 R

[56] References Cited

U.S. PATENT DOCUMENTS

| | | | |
|---|---|---|---|
| 4,852,976 | 8/1989 | Suzuki | 350/339 R |
| 4,909,606 | 3/1990 | Wada et al. | 350/347 R |

FOREIGN PATENT DOCUMENTS

| | | | |
|---|---|---|---|
| 0089493 | 2/1983 | European Pat. Off. | 350/340 |
| 0239433 | 9/1987 | European Pat. Off. | |
| 0246842 | 11/1987 | European Pat. Off. | 350/335 |
| 2171549A | 2/1986 | United Kingdom | 350/334 |

Primary Examiner—Stanley D. Miller
Assistant Examiner—Huy K. Mai
Attorney, Agent, or Firm—Cushman, Darby & Cushman

[57] ABSTRACT

A liquid crystal cell includes first and second substrates arranged to oppose each other, first and second electrodes formed on opposing surfaces of the first and second substrates, respectively, and a liquid crystal composition filled between the first and second substrates and arranged in a twisted mode. First and second polarizers are arranged on both sides of the liquid crystal cell. A first optical retardation film is arranged between the first substrate and the first polarizer, and a second optical retardation film is arranged between said second substrate and said second polarizer. The liquid crystal cell has a retardation value R0 of 0.4 to 0.85 μm, defined by an equation:

$$\Delta n \cdot d \cdot \cos^2\theta$$

where d is a distance between the first and second substrates, Δn is an optical anisotropy of the liquid crystal composition and θ is a tilt angle of the liquid crystal composition.

3 Claims, 5 Drawing Sheets

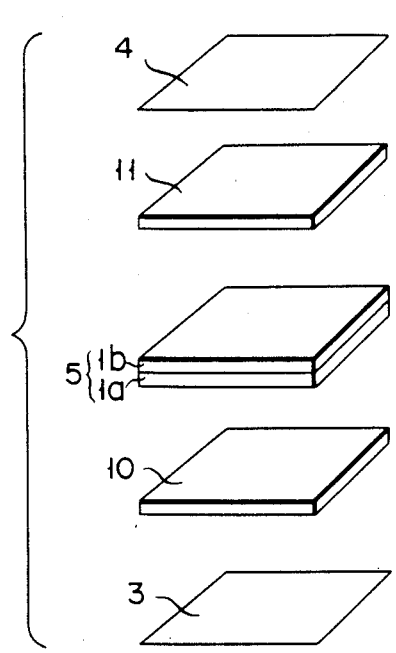
F I G. 3A
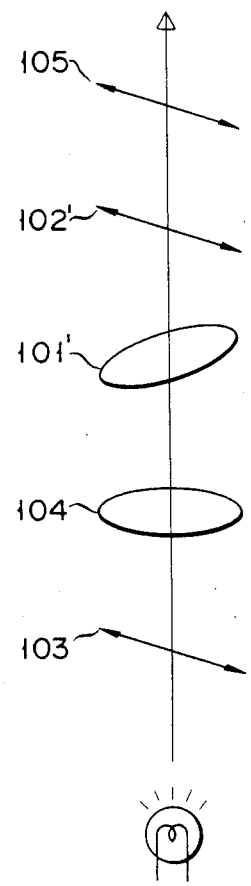
F I G. 3B

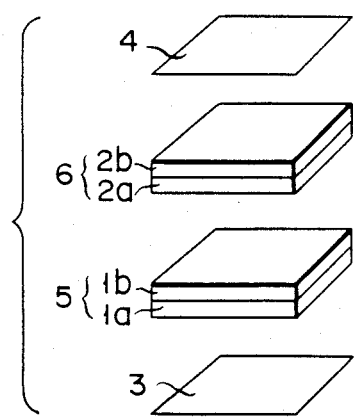
F I G. 6A
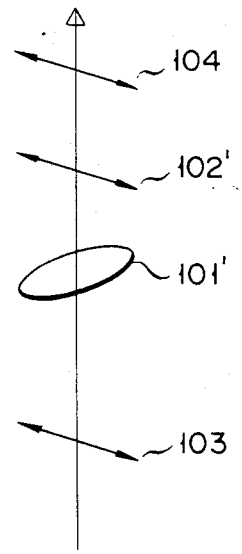
F I G. 6B
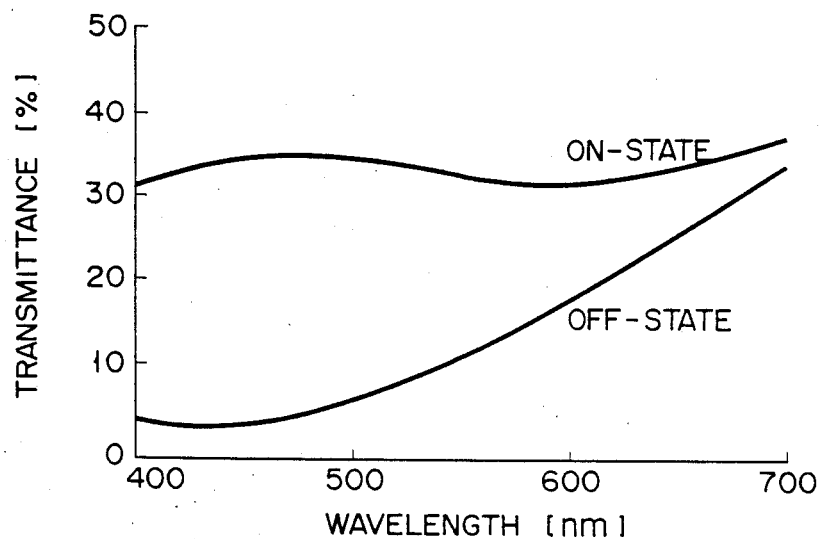
F I G. 7

LIQUID CRYSTAL DISPLAY DEVICE HAVING RETARDATION FILMS

RELATED APPLICATIONS

This application is related to application No. 07/376,541 and 07/376,659, both filed July 7, 1989 and to application Ser. No. 07/385,535 filed July 26, 1989.

BACKGROUND OF THE INVENTION

1. Field of the Invention

The present invention relates to a liquid crystal display device and, more particularly, to a liquid crystal display device in which a background of a liquid crystal display is achromatic.

2. Description of the Related Art

Liquid crystal display devices are classified into a TN type, a DS dynamic scattering type, a GH type, a DAP deformation of aligned phases type, a thermal write type, and the like in accordance with operation modes. Of these types, a TN liquid crystal display device has been widely used as a display device of a portable calculator, a measuring instrument, or the like.

The TN liquid crystal display device has, however, problems of, e.g., insufficient contrast and a narrow viewing range. As a large display capacity or a large display area of a personal computer has been increasingly required, a demand has arisen for development of a liquid crystal display device having a new operation mode.

As a liquid crystal display device having a new operation mode, Japanese Patent Disclosure (Kokai) No. 60-10702 discloses an SBE (supertwisted birefringence effect), electrically controlled birefringence liquid crystal display device. In this SBE liquid crystal display device, first and second transparent substrates, each having a transparent electrode on at least its one surface, are arranged to oppose each other and sealed to form a cell, and a nematic liquid crystal is sealed in this cell. A distance between the opposing substrates is about 3 to 12 μm.

Examples of the nematic liquid crystal are cyclohexane-, ester-, biphenyl-, and pyrimidine-based liquid crystals. A chiral agent is added to this nematic liquid crystal. Molecular axes of liquid crystal molecules are arranged in a twisted mode through 180° to 360° between the two transparent substrates. In this liquid crystal molecule, a molecule axis has a tilt angle $\theta$ larger than 5° with respect to the substrate surface because of the presence of an alignment film on the substrate. A retardation value R ($R = \Delta n \cdot d \cdot \cos^2\theta$) of the liquid crystal cell is 0.6 to 1.4 μm. In the above definition of R, $\Delta n$ is the optical anisotropy of the liquid crystal composition, d is the cell thickness (substrate spacing) of the liquid crystal cell, and $\theta$ is the tilt angle.

In an SBE liquid crystal display device having a molecular axis twist angle of 270°, a first polarizer is arranged on a first substrate, and a second polarizer is arranged on a second substrate. In this case, most preferably, a transmission axis of the first polarizer is twisted through about 30° clockwise with respect to a molecule alignment direction of the first substrate, and a transmission axis of the second polarizer is twisted through about 30° counterclockwise or about 60° clockwise with respect to the alignment direction of the second substrate.

In an SBE liquid crystal display device in which the transmission axis of the first polarizer is twisted through about 30° clockwise with respect to the molecule alignment direction of the first substrate and the transmission axis of the second polarizer is twisted through about 30° counterclockwise with respect to the alignment direction of the second substrate, a bright yellow display is obtained when no voltage is applied, and a black display is obtained when a voltage is applied (yellow mode).

In an SBE liquid crystal display device in which the transmission axis of the first polarizer is twisted through about 30° clockwise with respect to the molecule alignment direction of the first substrate and the transmission axis of the second polarizer is twisted through about 60° clockwise with respect to the alignment direction of the second substrate, a deep blue display is obtained when no voltage is applied, and a white display is obtained when a voltage is applied (blue mode).

In such an SBE liquid crystal display device, a change in transmitted light quickly responds to the voltage. Therefore, even in case of a display with a large line number operated, a high contrast and a wide viewing angle can be obtained.

As an example of a liquid crystal display device in which the tilt angle ($\theta$) is decreased by a rubbing technique, an ST (supertwisted) liquid crystal display device having a liquid crystal twist angle of 100° to 200° is known (SID'86DIGET, P. 122).

FIGS. 5A and 5B are views for explaining a principle of a conventional SBE or ST liquid crystal display device which performs a display by a birefringence effect. Referring to FIG. 5A, a liquid crystal cell 5 is constituted by first and second substrates 1a and 1b and a liquid crystal composition sealed therebetween. A first polarizer 3 is arranged on the first substrate 1a, and a second polarizer 4 is arranged on the second substrate 1b.

As shown in FIG. 5B, linearly polarized light 103 transmitted through the first polarizer 3 is transmitted through the liquid crystal cell 5 and generally becomes elliptically polarized light 101'. The elliptically polarized light transmitted through the liquid crystal cell 5 is transmitted through the second polarizer 4 arranged at a predetermined angle, and is sensed by a human eye. At this time, the shape of an ellipse depends on a twist angle $\Psi$ which is the twist angle of a liquid crystal molecule of the liquid crystal cell 5, a retardation value, and a wavelength $\lambda$.

In general, since the transmission changes in accordance with the wavelength, transmitted light becomes chromatic. When a voltage is applied to the liquid crystal cell to change alignment of the liquid crystal molecules, the optical anisotropy $\Delta n$ effectively changes, and the retardation value and transmission change accordingly. A liquid crystal display is performed by using such a principle.

As another example, Japanese Patent Disclosure (Kokai) No. 60-73525 discloses a liquid crystal display device in which the retardation value is 0.5 to 0.8 μm, a liquid crystal cell having a liquid crystal molecule twist angle of 270° is used, an optical axis of a polarizer arranged on each substrate is set at substantially 90°, and the optical axis of the polarizer set in a direction at which the twist angle of the liquid crystal is divided into two.

In any of the above conventional liquid crystal display devices, however, a background of a liquid crystal display becomes chromatic. For this reason, on a display using the conventional liquid crystal display device, black is displayed in a yellow background, and white is displayed in a blue background. Therefore, a readability evaluation differs in accordance with a visual sense of an observer, i.e., some observers evaluated that readability (e.g., a contrast) was degraded due to the background color. A color change caused by a viewing angle direction or temperature change is large.

In the TN liquid crystal display device, since a background of a liquid crystal display can be achromatic, a color display can be easily obtained by using a color filter. As described above, however, the TN liquid crystal display device has problems of insufficient contrast and viewing angle.

In the SBE liquid crystal display device, although a high contrast and a wide viewing angle can be obtained, a color display cannot be obtained because a background is chromatic. That is, it is difficult to manufacture a liquid crystal display device in which a high contrast and a wide viewing angle can be obtained and a background of a liquid crystal display is achromatic.

An OMI liquid crystal display device is known as a device which solves the above problems (Appl. Phys. Lett. 50(5), 1987, P. 236). This OMI liquid crystal display device has a liquid crystal twist angle of 180° and a retardation value of 0.5 to 0.6 μm. A transmission axis of one of the polarizers is parallel to a rubbing axis, and an angle defined between absorbing axes of the two polarizers is set to be 90° with respect to the rubbing axis.

In the OMI liquid crystal display device, however, since a twist angle of liquid crystal molecules is 180°, a change in transmitted light with respect to a voltage is not so rapid. Therefore, when a drive duty ratio is decreased, problems such as an insufficient contrast ratio, a narrow viewing angle, and a dark background arise.

Japanese Patent Disclosure (Kokai) Nos. 57-46227, 57-96315, and 57-125919 disclose two-layer-cell liquid crystal display devices which ca solve the dark background and the insufficient contrast. These devices include two TN liquid crystal cells arranged one upon the other, and polarizers arranged on both sides of the cell structure, and accomplish B/W display.

JJAP (26, NOV. 11. L177 84 (1987)) describes an example in which the above technique is applied to the SBE liquid crystal display device.

This two-layer-cell liquid crystal display device will be described with reference to FIGS. 6A and 6B. Referring to FIG. 6A, first and second liquid crystal cells 5 and 6 each having the above arrangement overlap each other. The two liquid crystal cells overlap such that twist directions of liquid crystal compositions of the respective cells oppose each other, and retardation values of the liquid crystal cells are substantially equal to each other. A first polarizer plate 3 is arranged on a substrate 1a of the first cell 5, and a second polarizer 4 is arranged on the substrate 2b of the second cell 6.

As shown in FIG. 6B, linearly polarized light 103 transmitted through the first polarizer 3 is transmitted through the first cell 5 to become elliptically polarized light 101'. This elliptically polarized light is transmitted through the second cell 6 to become linearly polarized light 102', transmitted through the second polarizer 4, and then sensed by a human eye.

In this case, it is important that the first and second cells 5 and 6 optically complement each other. Although the liquid crystal cells need not be complete optical complements of each other, an error between the retardation values of the liquid crystal cells preferably falls within the range of ±0.05 μm. As a result, wavelength-dependence of the elliptically polarized light transmitted through the first cell 5 becomes complementary with wavelength-dependence of the elliptically polarized light transmitted through the second cell 6. That is, the light transmitted through the first and second cells 5 and 6 does not have wavelength-dependence. Therefore, the liquid crystal display device of this type has an achromaic background. This means that all light components in a visible range can be used in a display and a bright display can be obtained.

In the two-layer liquid crystal cell ST liquid crystal display device, electrodes are formed on inner surfaces of the opposing substrates 1a and 1b and driven as in a normal dot-matrix liquid crystal display device. However, no electrode is formed on the substrates 2a and 2b of the second cell 6 (i.e., the liquid crystal is not driven). That is, the second cell 6 is used to merely correct the elliptically polarized light.

As described above, the two-layer liquid crystal cell ST liquid crystal display device has advantages in that a b/w display can be obtained and the number of scanning lines can be increased. However, the two-layer liquid crystal cell ST liquid crystal display device has a narrower viewing angle than that of the SBE or OMI liquid crystal display device and is expensive because two liquid crystal cells are used.

As described above, the ST or SBE liquid crystal display device having a twist angle of 180° has a liquid crystal display with a chromatic background. Although the OMI liquid crystal display device has an achromatic background, a liquid crystal display device having a high contrast and a bright background cannot be obtained.

The liquid crystal display device using two ST liquid cells can provide a b/w display with an achromatic background and a high contrast but is expensive.

SUMMARY OF THE INVENTION

It is, therefore, an object of the present invention to provide a liquid crystal display device having a liquid crystal display with an achromatic background, a large contrast ratio, and a wide viewing angle at low cost.

The above object of the present invention is achieved by a liquid crystal display device comprising:

(A) a liquid crystal cell including:
(a) first and second substrates arranged to oppose each other,
(b) first and second electrodes formed on opposing surfaces of said first and second substrates, respectively, and
(c) a liquid crystal composition filled between said first and second substrates and arranged in a twisted mode;

(B) first and second polarizers arranged on both sides of said liquid crystal cell;

(C) a first optical retardation film arranged between said first substrate and said first polarizer, and (D) a second optical retardation film arranged between said second substrate and said second polarizer;

wherein said liquid crystal cell has a retardation value R0 of 0.4 to 0.85 μm, defined by an equation:

$$\Delta n \cdot d \cdot \cos^2 \theta$$

where d is a distance between said first and second substrates, Δn is an optical anisotropy of said liquid crystal composition and $\theta$ is a tilt angle of said liquid crystal composition.

BRIEF DESCRIPTION OF THE DRAWINGS

FIGS. 3A and 3B are views for explaining an operation of the liquid crystal display device of the present invention;

FIGS. 5A to 6B are views showing operations of conventional liquid crystal display devices, respectively; and FIG. 7 is a graph showing wavelength-dependence of the transmission of the conventional liquid crystal display device.

DETAILED DESCRIPTION OF THE PREFERRED EMBODIMENTS

In order to provide an inexpensive liquid crystal display device having a liquid crystal display with an achromatic and bright background, a large contrast ratio, and a wide viewing angle, the present inventors made extensive studies and found that the above object of the present invention was achieved by a liquid crystal display device comprising:

(A) a liquid crystal cell including:
(a) first and second substrates arranged to oppose each other,
(b) first and second electrodes formed on opposing surfaces of said first and second substrates, respectively, and
(c) a liquid crystal composition filled between said first and second substrates and arranged in a twisted mode;

(B) first and second polarizers arranged on both sides of said liquid crystal cell;

(C) a first optical retardation film arranged between said first substrate and said first polarizer, and (D) a second optical retardation film arranged between said second substrate and said second polarizer;

wherein said liquid crystal cell has a retardation value R0 of 0.4 to 0.85 μm, defined by an equation:

$$\Delta n \cdot d \cdot \cos^2 \theta$$

where d is a distance (substrate spacing) between said first and second substrates, $\Delta n$ is an optical anisotropy of said liquid crystal composition and $\theta$ is a tilt angle of said liquid crystal composition.

Figure 1:
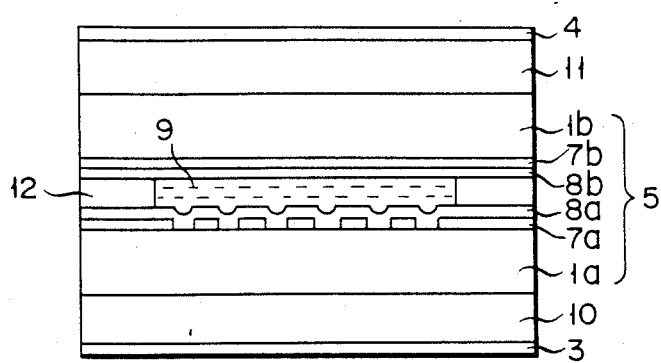
FIG. 1 is a longitudinal sectional view showing a liquid crystal display device according to an embodiment of the present invention.

FIG. 1 is a longitudinal sectional view showing an embodiment according to a liquid crystal display device of the present invention. Referring to FIG. 1, a first substrate 1a on which a transparent electrode 7a and an alignment film 8a are formed, and a second substrate 1b on which a transparent electrode 7b and an alignment film 8b are formed, are arranged to oppose each other in a substantially parallel manner. The transparent electrodes 7a and 7b consist of, e.g., ITO (indium tin oxide). The alignment films 8a and 8b are thin films consisting of, e.g., polyimide or SiO, for adjusting a tilt angle of a liquid crystal molecule with respect to the substrate.

A liquid crystal composition 9 is filled between the first and second substrates 1a and 1b and sealed with a sealing agent 12 such as an epoxy adhesive, thereby constituting a liquid crystal cell 5.

Figure 2A:
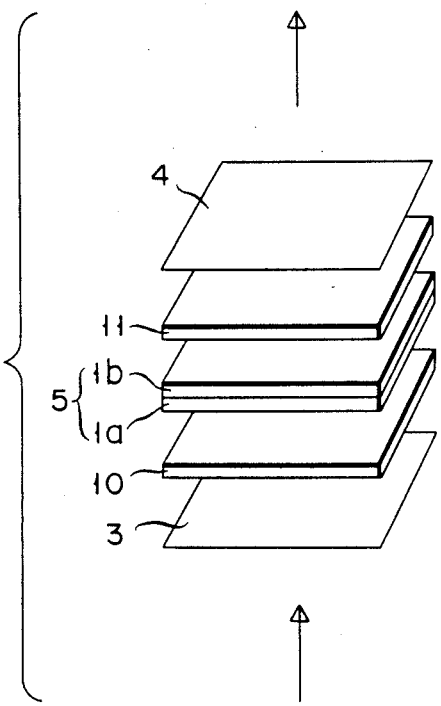
FIGS. 2A and 2B are views showing a relationship between an alignment direction, a direction of an absorbing axis of a polarizer, and an optical axis direction of an optical delay plate of the liquid crystal display device according to the embodiment of the present invention.
Figure 2B:
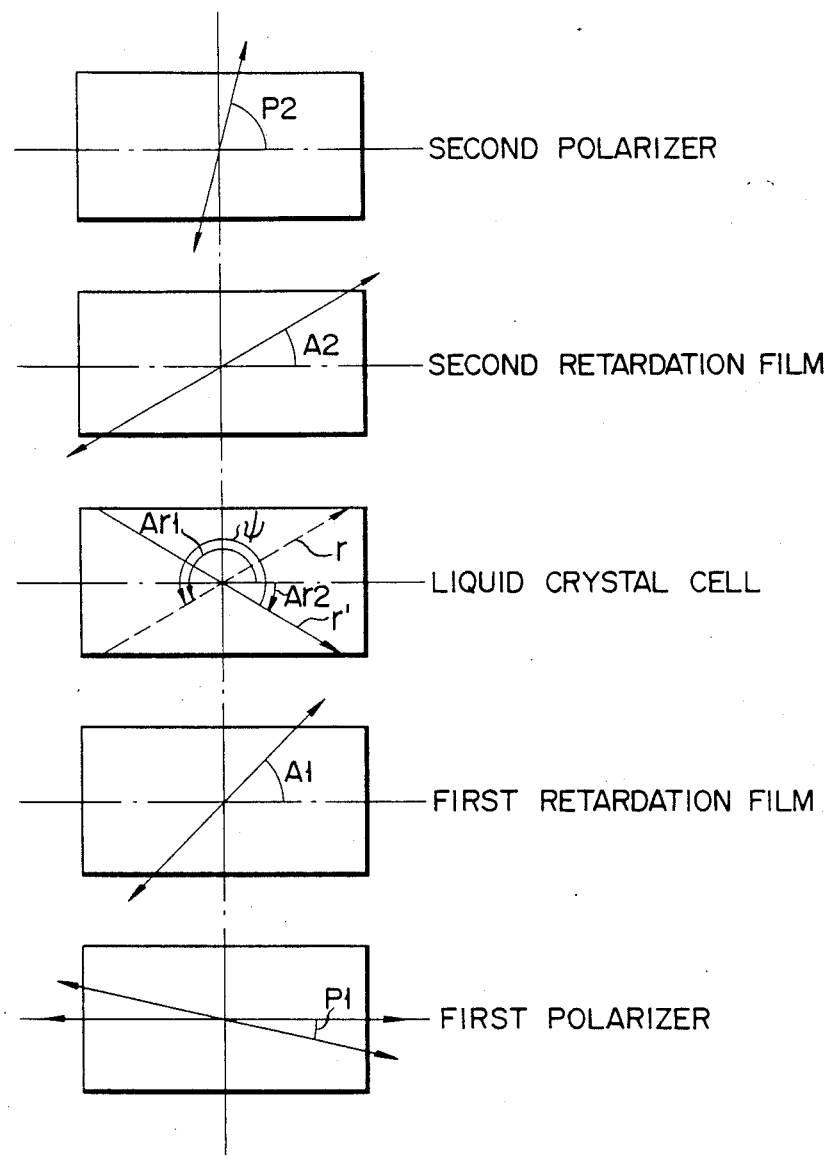

The composition 9 is arranged in a twisted mode by an alignment direction r of the first substrate 1a and an alignment direction r' of the second substrate 1b (see FIG. 2). The composition 9 preferably has a larger angle (twist angle) of twisted alignment. This is because when a voltage is applied to the cell 5, an alignment angle of the liquid crystal molecule changes more rapidly with a larger twist angle, thereby obtaining a higher contrast. Therefore, in the present invention, the twist angle of the liquid crystal composition is preferably about 180° to 270°.

A conventional liquid crystal can be used in the present invention. Preferable examples of the liquid crystal are cyclohexane- and ester-based nematic liquid crystals, a pyrimidine-based liquid crystal, including those available from Merk & Co. and Hoffman Larosch Co.

A first optical retardation film 10 is formed on the first substrate 1a of the liquid crystal 5 having the above arrangement. A second optical retardation film 11 is formed on the second substrate 1b. The optical retardation film has functions of converting linearly polarized light into elliptically polarized light or converting elliptically polarized light into linearly polarized light or linearly polarized light close to elliptically polarized light. The retardation film can comprise a stretched organic film such as a stretched polyvinyl alcohol film. In addition, retardation values of the two optical retardation films are preferably equal to each other in mass production.

A first polarizer 3 is formed on the first retardation film 10, and a second polarizer 4 is formed on the second retardation film 11.

In this embodiment, the optical retardation films and the substrates are separately provided. However, each optical retardation film and the corresponding substrate may be constituted by one member; i.e., the retardation film can also function as a substrate.

An operation of the liquid crystal display device of the present invention will be described below with reference to FIGS. 3A and 3B. Referring to these figures, linearly polarized light 103 transmitted through the first polarizer 3 is transmitted through the first retardation film 10 to become elliptically polarized light 104. The light 104 is transmitted through the cell 5 to become elliptically polarized light 101' having a different shape as that of the light 104. The light 101' is transmitted through the second retardation film 11 to become linearly polarized light or elliptically polarized light close to substantially linearly polarized light 102'. Finally, the light 102' is transmitted through the second polarizer 4 and sensed by a human eye.

In this case, a method of obtaining the linearly polarized light or elliptically polarized light close to substantially linearly polarized light 102' is important. According to studies made by the present inventors, assuming that a retardation value of the liquid crystal cell is R0, a good effect and a high-contrast b/w display were obtained when R0 was 0.4 to 0.85 μm and the retardation value of each optical delay plate fell within the range of R0×0.3 to R0×1.0.

When the retardation value of the optical retardation film is smaller than R0×0.3, a difference between spectral transmission obtained when a voltage is applied and that obtained when no voltage is applied is decreased, resulting in a low contrast. When the retardation value of the optical retardation film exceeds R0×1.0, spectral transmission at only a specific wavelength is increased to cause the display to be chromatic. Therefore, in the liquid crystal display device of the present invention, assuming that the retardation value of the liquid crystal cell is R0, it is preferred that R0 falls within the range of 0.4 to 0.85 μm and the retardation value of each optical retardation film falls within the range of R0×0.3 to R0×1.0.

EXAMPLE 1

An example of a liquid crystal display device according to the present invention will be described in detail below with reference to FIGS. 1, 2, and 4. Referring to FIG. 1, as described above, the first substrate 1a on which an ITO transparent electrode 7a and a polyimide alignment film 8a are formed, and the second substrate 1b on which an ITO electrode 7b and a polyimide alignment film 8b are formed, are arranged to oppose each other in a substantially parallel manner. Between the substrates, a liquid crystal composition 9 is sealed and the substrates are securely sealed with a sealing material 12, forming a liquid crystal cell 5. In the cell 5, the liquid crystal molecules are aligned in a twisted mode with a counterclockwise twist angle of 240° from the substrate 1b to the substrate 1a by the alignment direction r of the substrate 1a and the alignment direction of the substrate 1b. The tilt angle was 1.5°, and the distance between the substrates was 6.6 μm. The directions of r (Ar1) and r' (Ar2) was set at −30° and +210°, respectively.

A liquid crystal composition prepared by adding S-811 (E. MERK Co.) as a counterclockwise chiral agent to ZLI-1577 (E. MERK Co.) was used. An optical anisotropy Δn of this liquid crystal composition was 0.115, and the retardation value R0 was therefore about 0.67 μm.

The first optical retardation film 10 consisting of a stretched polyvinyl alcohol was arranged on the first substrate 1a such that its optical axis was angled at A1=120° from the horizontal direction. Similarly, the second optical retardation film 11 consisting of a stretched polyvinyl alcohol was arranged on the second substrate 1b such that its optical axis was angled at A2=50° from the horizontal direction. The retardation value R of the first retardation film 10 was 0.4000 μm, and that of the second retardation film 11 was 0.400 μm. The polarizers were arranged such that their absorption axes were set at P1=90°, and P2=−6°, respectively (see FIG. 2B).

Figure 4:
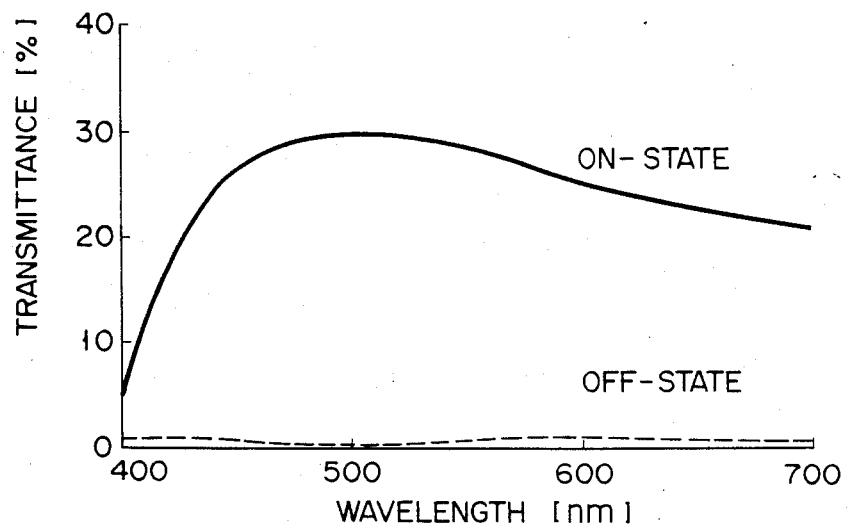
FIG. 4 is a graph showing wavelength-dependence of the transmission of the liquid crystal display device of the present invention.
Figure 5A:
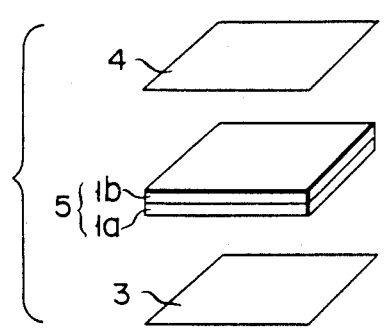
Figure 5B:
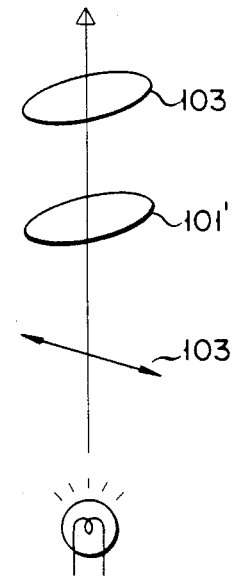

The wavelength-dependency of the transmission when this liquid crystal cell 5 is applied with a voltage to turn-on and turn-off the liquid crystal is shown in FIG. 4. As seen from the figure, the transmittance in both on- and off-state is substantially flat independent of the waveform. The device can exhibit achromatic display; it was of normally black mode in which black was displayed when in off-state, and white was displayed when in on-state. Further, when the cell was multiplexed by a 1/200 duty, a contrast ratio was as large as about 15:1, and a viewing angle was large.

EXAMPLE 2

A liquid crystal cell was formed following the same procedures as in Example 1 except that the cell thickness (the distance between the substrates) of the liquid crystal cell was set to be 6.0 μm.

As a liquid crystal composition, used was ZLI-2293 (E. Merk Co.). The optical anisotropy Δn of the liquid crystal composition was 0.132, and therefore the retardation R0 was about 0.79 μm.

The first optical retardation film 10 consisting of a stretched polyvinyl alcohol was arranged on the first substrate 1a such that its optical axis was angled at A1=130° from the horizontal direction. Similarly, the second optical retardation film 11 consisting of a stretched polyvinyl alcohol was arranged on the second substrate 1b such that its optical axis was angled at A2=45° from the horizontal direction. The retardation value R of the first retardation film 10 was 0.300 μm, and that of the second retardation film 11 was 0.365 μm. The polarizers were arranged such that their absorption axes were set at P1=0°, and P2=90°, respectively.

When the cell was multiplexed by a 1/200 duty, a contrast ratio was as large as about 30:1, and a viewing angle was large.

EXAMPLE 3

A liquid crystal cell was formed following the same procedures as in Example 1 except that the cell thickness of the liquid crystal cell was set to be 6.6 μm and as a liquid crystal composition NR4244 (F. Hoffman Larosch Co.) was used. The optical anisotropy Δn of the liquid crystal composition was 0.093, and therefore the retardation R0 was about 0.61 μm.

The first optical retardation film 10 having a retardation value of 0.299 μm was arranged on the first substrate 1a such that its optical axis was angled at A1=135° from the horizontal direction. Similarly, the second optical retardation film 11 having retardation value of 0.365 μm was arranged on the second substrate 1b such that its optical axis was angled at A2=45° from the horizontal direction. The retardation value R of the first retardation film 10 was 0.300 μm, and that of the second retardation film 11 was 0.365 μm. The polarizers were arranged such that their absorption axes were set at P1=0°, and P2=75°, respectively.

When the cell was multiplexed by a 1/200 duty, a contrast ratio was as large as about 6:1, and a viewing angle was large.

EXAMPLE 4

A liquid crystal display device was formed following the same procedures as in Example 1 except that ZLI3695-000(E. Merk Co.) was used as a liquid crystal composition. The optical anisotropy Δn of the liquid crystal composition was 0.120, and the retardation value thereof was about 0.79 μm.

The first optical retardation film 10 having a retardation value of 0.400 μm was arranged on the first substrate 1a such that its optical axis was angled at A1=113° from the horizontal direction. Similarly, the second optical retardation film 11 having a retardation value of 0.400 μm was arranged on the second substrate 1b such that its optical axis was angled at A2=75° from the horizontal direction. The polarizers were arranged such that their absorption axes were set at P1=80°, and P2=8°, respectively.

This display device of a normally black mode, and when the cell was multiplexed by a 1/200 duty, a contrast ratio was as large as about 20:1, and a viewing angle was large.

EXAMPLE 5

A liquid crystal display device was formed following the same procedures as in Example 1 except that ZLI-3743 (E. Merk Co.) was used as a liquid crystal composition. The optical anisotropy $\Delta n$ of the liquid crystal composition was 0.125, and the retardation value thereof was about 0.83 μm.

The first optical retardation film 10 having a retardation value of 0.400 μm was arranged on the first substrate 1a such that its optical axis was angled at A1 = 107° from the horizontal direction. Similarly, the second optical retardation film 11 having a retardation value of 0.400 μm was arranged on the second substrate 1b such that its optical axis was angled at A2 = 86° from the horizontal direction. The polarizers were arranged such that their absorption axes were set at P1 = 64°, and P2 = 30°, respectively.

This display device was of a normally black mode, and when the cell was multiplexed by a 1/200 duty, a contrast ratio was as large as about 8:1, and a viewing angle was large.

EXAMPLE 6

A liquid crystal display device was formed following the same procedures as in Example 1 except that ZLI-1577 (E. Merk Co.) was used as a liquid crystal composition. The optical anisotropy $\Delta n$ of the liquid crystal composition was 0.115, and the retardation value thereof was about 0.76 μm.

The first optical retardation film 10 having a retardation value of 0.365 μm was arranged on the first substrate 1a such that its optical axis was angled at A1 = 116° from the horizontal direction. Similarly, the second optical retardation film 11 having a retardation value of 0.365 μm was arranged on the second substrate 1b such that its optical axis was angled at A2 = 75° from the horizontal direction. The polarizers were arranged such that their absorption axes were set at P1 = 73°, and P2 = 13°, respectively.

This display device was of a normally black mode, and when the cell was multiplexed by a 1/200 duty, a contrast ratio was as large as about 10:1, and a viewing angle was large.

EXAMPLE 7

A liquid crystal display device was formed following the same procedures as in Example 1 except that ZLI-3711 (E. Merk Co.) was used as a liquid crystal composition. The optical anisotropy $\Delta n$ of the liquid crystal composition was 0.1045, and the retardation value thereof was about 0.69 μm.

The first optical retardation film 10 having a retardation value of 0.365 μm was arranged on the first substrate 1a such that its optical axis was angled at A1 = 90° from the horizontal direction. Similarly, the second optical retardation film 11 having a retardation value of 0.300 μm was arranged on the second substrate 1b such that its optical axis was angled at A2 = 60° from the horizontal direction. The polarizers 3 and 4 were arranged such that their absorption axes were set at P1 = 48°, and P2 = 19°, respectively.

This display device was of a normally black mode, and when the cell was multiplexed by a 1/200 duty, a contrast ratio was as large as about 10:1, and a viewing angle was large.

EXAMPLE 8

A liquid crystal display device was formed following the same procedures as in Example 1 except that NR4244 (F. Hoffman Larosch) was used as a liquid crystal composition. The optical anisotropy $\Delta n$ of the liquid crystal composition was 0.093, and therefore the retardation R0 was about 0.61 μm.

The first optical retardation film 10 having a retardation value of 0.630 μm was arranged on the first substrate 1a such that its optical axis was angled at A1 = 45° from the horizontal direction. Similarly, the second optical retardation film 11 having a retardation value of 0.300 μm was arranged on the second substrate 1b such that its optical axis was angled at A2 = 145° from the horizontal direction. The polarizers 3 and 4 were arranged such that their absorption axes were set at P1 = 0°, and P2 = 90°, respectively.

When the cell was multiplexed by a 1/200 duty, a contrast ratio was as large as about 20:1, and a viewing angle was large.

EXAMPLE 9

In Example 2, the optical retardation film was used as the substrate 1b; the retardation film acted also the substrate.

COMPARATIVE EXAMPLE

A liquid crystal cell was formed following the same procedures as in Example 1 except that, as a liquid crystal composition, used was ZLI-2293 (E. Merk Co.). The optical anisotropy $\Delta n$ of the liquid crystal composition was 0.132, and therefore the retardation R0 was about 0.87 μm.

The first optical retardation film 10 consisting of a stretched polyvinyl alcohol was arranged on the first substrate 1a such that its optical axis was angled at A1 = 45° from the horizontal direction. Similarly, the second optical retardation film 11 consisting of a stretched polyvinyl alcohol was arranged on the second substrate 1b such that its optical axis was angled at A2 = 30° from the horizontal direction. The retardation value R of the first retardation film 10 was 0.299 μm, and that of the second retardation film 11 was 1.1 μm. The polarizers 3 and 4 were arranged such that their absorption axes were set at P1 = 0°, and P2 = 75°, respectively.

The wavelength-dependency of this cell when in on- and off-states is shown in FIG. 7. As seen from the figure, yellow color appeared when in an off-state of the cell.

What is claimed is:

1. A liquid crystal display device comprising:
   (A) a liquid crystal cell including:
      (a) first and second substrates arranged to oppose each other,
      (b) first and second electrodes formed on opposing surfaces of said first and second substrates, respectively, and
      (c) a liquid crystal composition filled between said first and second substrates and arranged in a twisted mode;
   (B) first and second polarizers arranged on both sides of said liquid crystal cell;
   (C) a first optical retardation film arranged between said first substrate and said first polarizer; and (D) a second optical retardation film arranged between said second substrate and said second polarizer;

wherein said liquid crystal cell has a retardation value R0 of 0.4 to 0.85 μm, defined by an equation:

$$\Delta n \cdot d \cdot \cos^2\theta$$

where d is a distance between said first and second substrates, Δn is an optical anistropy of said liquid crystal composition and θ is a tilt angle of said liquid crystal composition; and wherein a retardation value of each of said first and second optical retardation films falls within a range of R0×0.3 to R0×1.0.

2. The device according to claim 1, wherein said first and second optical retardation films have the same retardation value.

3. The device according to claim 1, wherein said first substrate and said first optical retardation film are provided by one member, or said second substrate and said second optical retardation film are provided by one member.

* * * * *